UNITED STATES PATENT OFFICE.

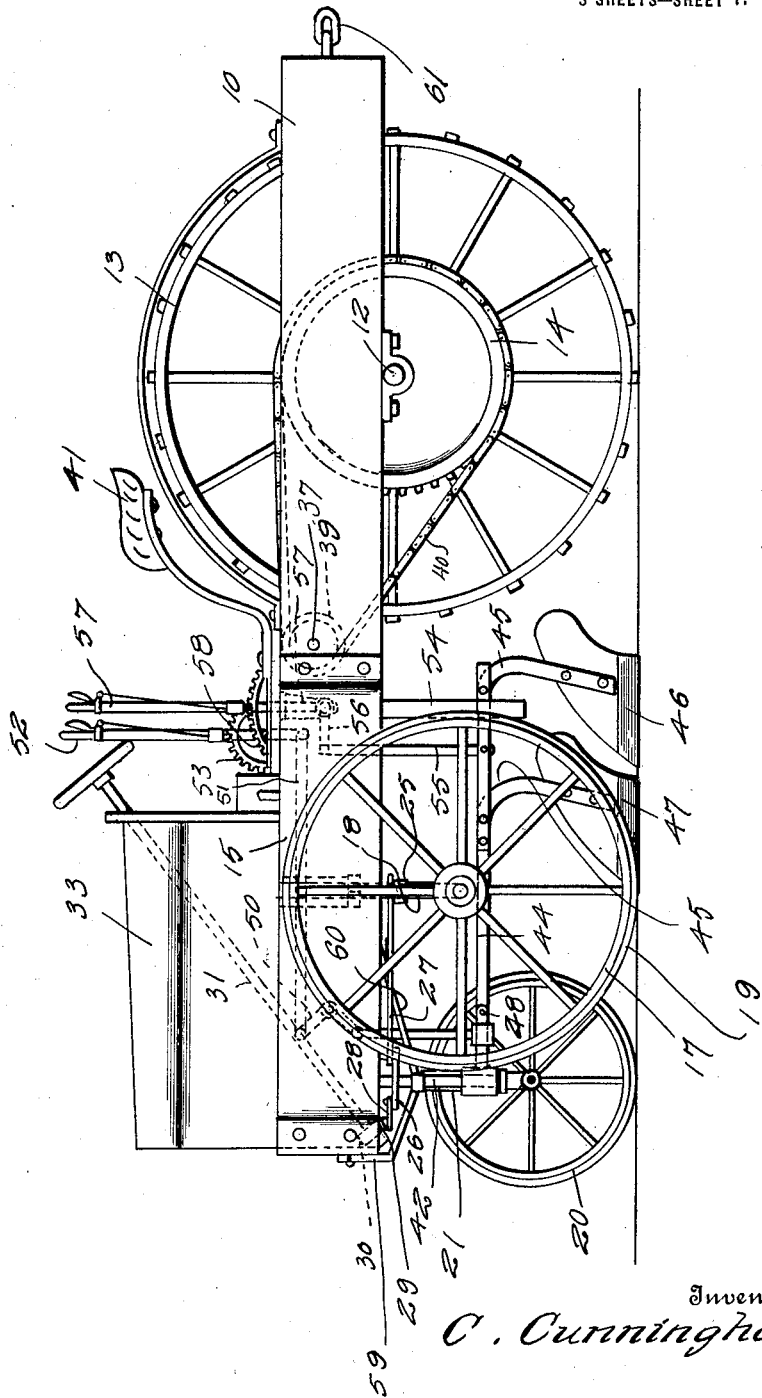

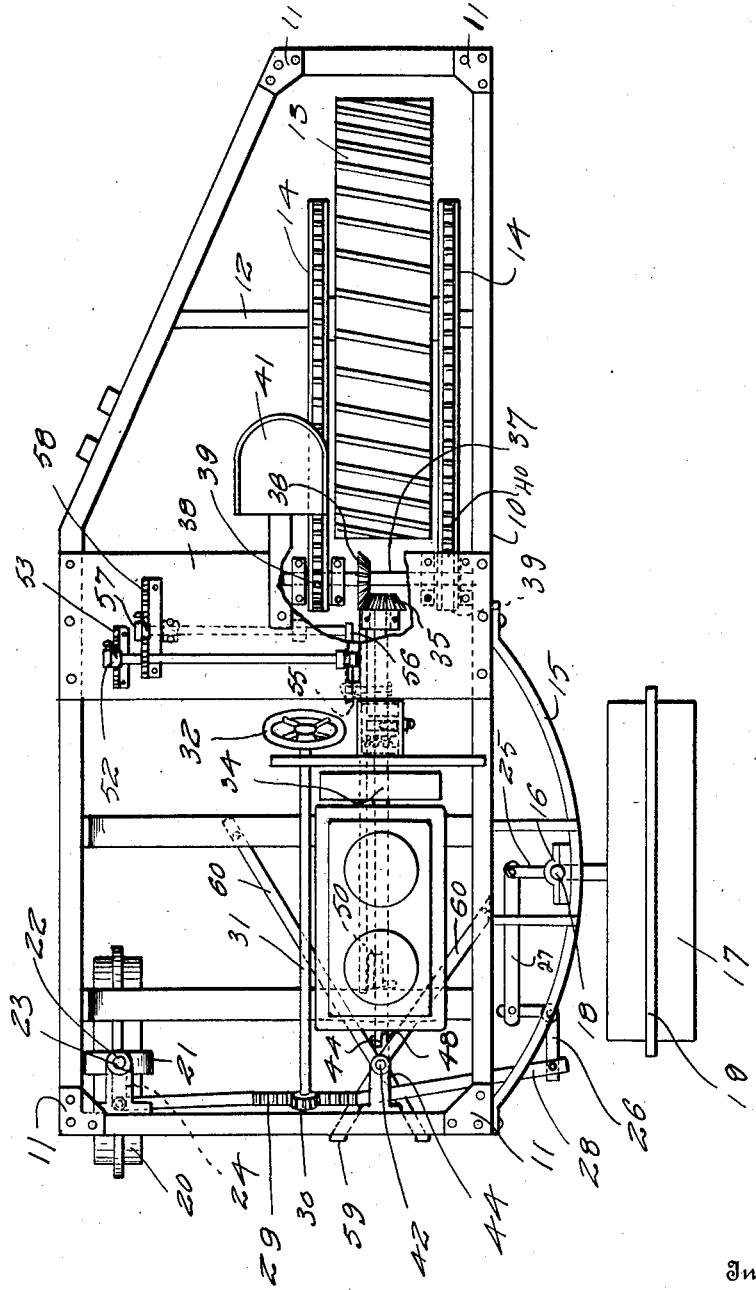

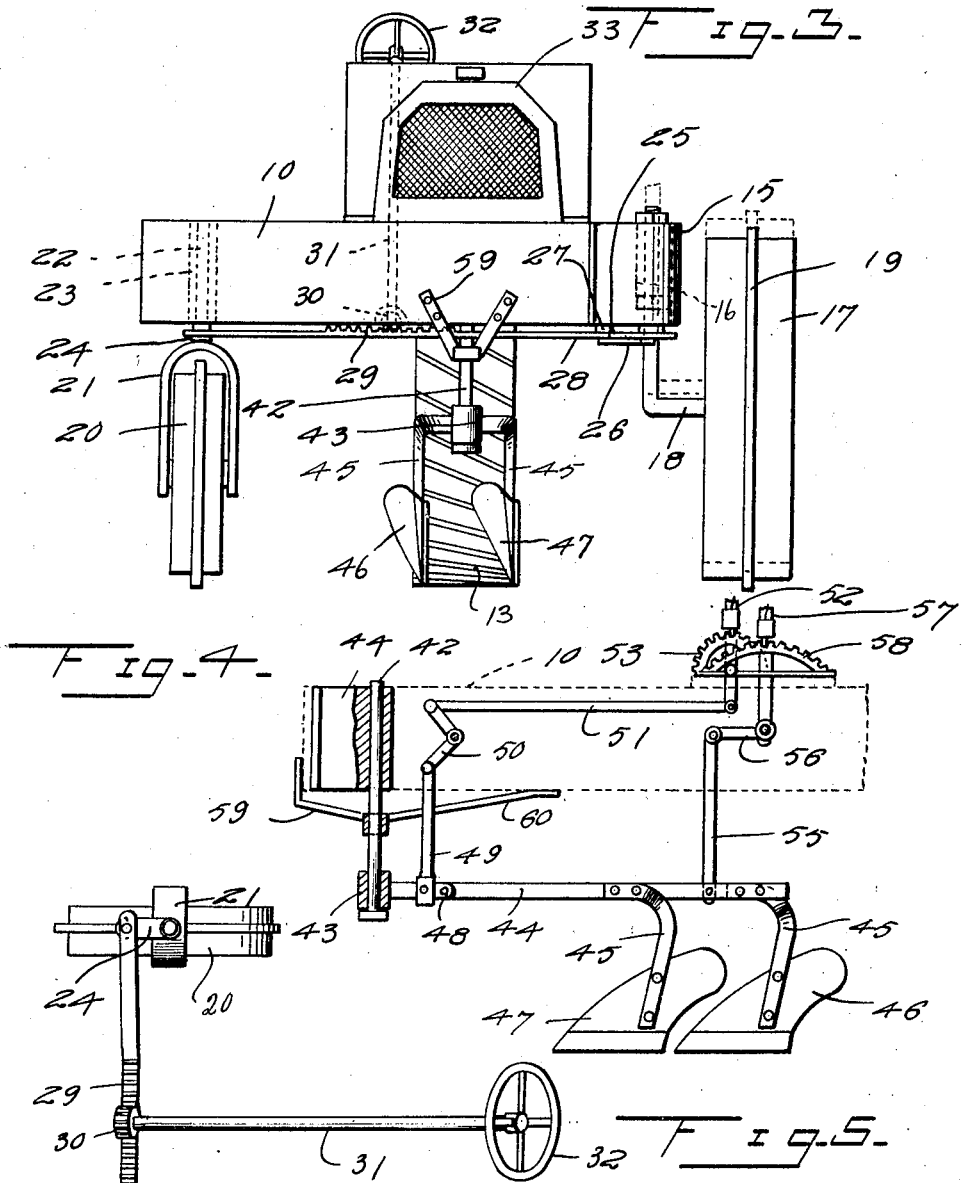

CLEVELAND CUNNINGHAM, OF PITTSBURG, KANSAS.

PLOWING-TRACTOR.

1,385,668.  Specification of Letters Patent.  Patented July 26, 1921.

Application filed December 24, 1919. Serial No. 347,122.

*To all whom it may concern:*

Be it known that I, CLEVELAND CUNNINGHAM, a citizen of the United States, residing at Pittsburg, in the county of Crawford and State of Kansas, have invented certain new and useful Improvements in Plowing-Tractors, of which the following is a specification, reference being had to the accompanying drawings.

This invention relates to plowing machines, and particularly to tractor plowing machines.

The general object of my invention is to provide a compact and rigid plowing tractor which can be driven close to the ends of the field, and which can be used both on large and small fields with economy and effectiveness, and further a plowing tractor so constructed that the plows may be disconnected from the tractor to permit the tractor to be used for other purposes.

A further object is to provide a construction of this character wherein one of the front wheels is adapted to travel in a furrow, while the other front wheel is adapted to travel on the unplowed land and can be adjusted to suit the depth of cut of the plows so as to hold the tractor frame in a horizontal position at all times.

A further object is to provide a tractor of this character wherein the plows may be hitched directly ahead of the rear drive wheel, and wherein the weight of the engine is in the center of the frame and approximately on the line of the front wheels and straight ahead of the large drive wheel so that the structure is balanced throughout.

Other objects will appear in the course of the following description.

My invention is illustrated in the accompanying drawings, wherein:—

Figure 1 is a side elevation of a tractor plow constructed in accordance with my invention;

Fig. 2 is a top plan view of the construction shown in Fig. 1;

Fig. 3 is a front elevation of the construction shown in the drawings;

Fig. 4 is a fragmentary vertical sectional view to show the manner in which the plows are operated;

Fig. 5 is a fragmentary plan view of the steering mechanism.

Referring to these drawings, it will be seen that the framework of the tractor, designated 10, is formed of heavy angle or channel irons held to each other at their junctions by means of gussets 11. In plan view, the land side of the frame is straight from end to end of the tractor, while the other side of the frame is parallel to the first named side for a portion of the length of the tractor, then inclines rearward, and toward the opposite side of the frame. Mounted in suitable bearings on the rear portion of the frame is a transverse shaft 12, carrying upon it the rear driving wheel 13 which is relatively wide and relatively large in diameter and the face of this wheel is provided with driving lugs or teeth. Mounted upon the shaft 12 are a pair of relatively large sprocket wheels 14 disposed, one on each side of the drive wheel or bull wheel 13. Attached to the forward end of the frame on the land side thereof is an outwardly bowed web 15, which is connected by bracing webs to the adjacent portion of the main frame, and this web 15 carries upon it the vertically disposed socket or bearing 16. The land wheel 17 has its axle upwardly bent, as at 18, and extended upward through the socket 16, and the vertical portion of this axle is adjustable in the socket 16, and is shown as provided with a collar and set nuts for the purpose of adjusting the height of the wheel. This wheel is designed to run on the land and is relatively wide, and is shown as provided with the medial rib 19.

On the opposite side of the frame, but disposed in advance of the wheel 17, is a relatively small steering wheel 20 which is mounted on an axle supported in a yoke 21, this yoke terminating in an upwardly extending shaft 22 extending upward through a suitable bearing 23 at the forward corner of the main frame. Attached to this shaft 22 is an arm 24. Attached to the vertical portion 18 of the axle of wheel 17 is an arm 25, and mounted upon the main frame is a bell crank lever 26 which is connected to the arm 25 by means of a link 27. This bell crank lever in turn is connected to a transversely extending rod 28 operatively connected to the arm 24. This rod 28 is formed with rack teeth 29 and engaged by a pinion 30 carried upon an upwardly and rearwardly extending steering post 31 carrying a steering wheel 32 at its upper end. By this means, both of the wheels 19 and 20 are shifted coincidently to steer the machine.

The engine, which is an internal combustion engine, such as is commonly used in tractors, is disposed at the forward end of the machine within a hood 33, as is usual. This engine has a drive shaft 34 extending from it, carrying a beveled gear wheel 35 and engaging a beveled gear wheel 36 mounted upon a transverse shaft 37 supported in bearings on a transverse supporting beam 38, which is preferably of channel iron. This shaft 37 carries upon it two sprocket wheels 39, over which sprocket chains 40 pass to the sprocket wheels 14. Of course, the engine shaft 34 is to be provided with the usual clutch for operatively engaging the engine with the driving wheels or disengaging it therefrom. A seat 41 is also mounted upon this transverse beam 38.

For the purpose of supporting the plow beams and plows, I provide at the forward end of the machine a downwardly extending pin or bolt 42, and slidingly mounted upon this bolt is a sleeve or collar 43, to which the main plow beam 44 is connected. This main plow beam 44 extends rearward, and has mounted upon it a plurality of plow standards 45. I have illustrated two standards 45 and two plows 46 and 47 engaged therewith. These plows are disposed, one in advance of the other, and the plow 46, it will be seen, is disposed on a transverse line nearly coincident with that of the seat 41. Thus, the operator sitting in the seat 41 can look directly downward onto the plows and onto the ground which the plows are working. The plow beam 44 is pivotally connected to the collar 43, at 48, and forwardly of this pivotal connection 48 there is attached to the collar 43, or more properly to the rearward extension of this collar, a link 49 which is connected to a bell crank lever 50 mounted on the frame of the machine, and this in turn is connected by a link 51 to a lever 52 moving over an arcuate rack 53 mounted upon the beam 38. The rear end of the plow beam 44 passes through a vertical guide 54 on the frame of the machine, and is pivotally connected to an upwardly extending link 55, in turn connected to an arm 56 extending out from a lever 57. This lever 57 also moves over an arcuate rack 58, and both the lever 52 and the lever 57 are to be provided with the usual hand actuated bolt or detent for locking the levers in their adjusted position on the arcuate racks. By operating both of the levers 52 and 57, it is possible to shift both the forward and rear ends of the plow beam 44 upward to thus bodily raise or lower the plow beams and the plows. By operating the lever 52, the forward end of the plow beam 44 may be raised to any desired height, and then the operation of the lever 56 may be controlled to raise the plow beam to an inoperative position or lower it to a position where the plows will properly engage the ground.

It will be seen that the strain on the plows is transmitted to the pin 42, and this pin may be braced by means of a U-shaped iron 59 attached to the forward end of the plow. It may be further braced by an upwardly and rearwardly inclined bracing member 60. The rear end of the tractor is provided with any suitable draft clevises or like devices 61.

Two plows are shown. The distance between the inside face of the wheel 20 and the outside face of the drive wheel 13 is approximately 28″, and the two 14″ plow beams 46 and 47 cut the entire distance between the inside face of the wheel 20 and the outside face of the large drive wheel. The wheel 19 is designed to run on the unplowed land, and the inside face of this wheel is preferably disposed about 14″ from the edge of the last furrow. The front wheel 20 on the right hand side of the tractor follows the furrow previously made. The large drive wheel follows the second plow so that this drive wheel always has a smooth and relatively solid place to travel in. The left or land wheel is adjustable to suit the depth of cut to which the plows are adjusted. If the plows are running, for instance, 6″ in the ground, the land wheel will be raised 6″ above the bottoms of the plows so as to keep the frame always level. The plows are carried by the main frame of the tractor and can be detached in a few minutes' time so that the tractor may be used for other work on the farm. The weight of the engine is in the center of the front of the machine, and the engine is disposed straight ahead of the large drive wheel so that it is balanced throughout. The front wheels are disposed, one in advance of the other, about 3′ so as to hold the main driving wheel steady. The tractor will turn in a very short radius, can be easily handled, and can be driven close to the ends of a field so as to economize space.

While I have illustrated certain details of construction and arrangement of parts which I believe to be particularly effective, I do not wish to be limited thereto, as it is obvious that many changes might be made in these details without in any way departing from the spirit of the invention as defined in the appended claims.

I claim:—

1. A plowing tractor of the character described comprising a main frame, a relatively large driving wheel disposed at the rear end of the main frame, an engine mounted upon the forward end of the frame in line with said driving wheel and operatively connected thereto to drive it, a steering wheel disposed at one forward corner of the main frame remote from that side of the frame upon which the engine is mounted, a steering wheel disposed on the other side of the main frame rearward of the first named wheel and of relatively large size, both of said steering wheels being mounted for rotative steering movement and having arms projecting from the spindles thereof, a transversely extending steering rack, a steering wheel, a shaft having a pinion operatively engaging said rack whereby to shift it laterally, and operative connections between the ends of said rack and the arms of the wheel spindles whereby to positively and coincidently shift said wheels for steering movement.

2. A plowing tractor of the character described comprising a main frame, a relatively large driving wheel disposed at the rear end of the frame adjacent one side thereof, an engine mounted upon the forward end of the frame adjacent the same side thereof and in line with the driving wheel, operative connections between the engine and the driving wheel, a relatively small steering wheel disposed at one forward corner of the main frame remote from that side of the frame upon which the engine is mounted, a laterally extending supporting member mounted upon the opposite side of the frame adjacent the forward end thereof and projecting laterally therefrom, a steering wheel, an axle therefor extending inward from the steering wheel and then extending upwardly and being rotatably mounted in said laterally extending supporting member, the vertical portion of said axle being vertically adjustable in the laterally extending member, means operatively connecting the two forward wheels to cause their coincident steering movement, and means controlled by the operator for shifting said steering wheels toward the right or left.

3. A plowing tractor of the character described comprising a main frame straight along one side from end to end, the opposite side of the frame extending straight for a certain distance from the front to the rear and then extending rearward from the other side of the frame, a relatively large driving wheel disposed at the rear end of the frame adjacent the straight side thereof, an engine mounted upon the forward end of the frame adjacent the straight side thereof and operatively connected to the driving wheel, a steering wheel disposed at one forward corner of the main frame remote from that side of the frame upon which the engine is mounted, an outwardly bowed beam mounted upon the straight side of the frame at the forward end thereof and projecting laterally therefrom, a steering wheel, an axle therefor extending inward from the steering wheel and then extending upwardly and being rotatively mounted in said bowed beam, means operatively connecting the two forward wheels to cause their coincident steering movement, and means controlled by the operator for shifting said steering wheels toward the right or left.

In testimony whereof I hereunto affix my signature.

CLEVELAND CUNNINGHAM.